United States Patent
Tarlton

(10) Patent No.: US 7,222,718 B2
(45) Date of Patent: May 29, 2007

(54) ACCUMULATING CONVEYOR SYSTEM

(75) Inventor: Curtis S. Tarlton, Short Hills, NJ (US)

(73) Assignee: Nedco Conveyor Company, Union, NJ (US)

( * ) Notice: Subject to any disclaimer, the term of this patent is extended or adjusted under 35 U.S.C. 154(b) by 0 days.

(21) Appl. No.: 11/050,287

(22) Filed: Feb. 2, 2005

(65) Prior Publication Data

US 2005/0167239 A1   Aug. 4, 2005

Related U.S. Application Data

(60) Provisional application No. 60/541,300, filed on Feb. 2, 2004.

(51) Int. Cl.
*B65G 47/00* (2006.01)

(52) U.S. Cl. ............... 198/445; 198/347.4; 198/442; 198/443; 198/605; 198/447; 198/450; 198/452; 198/453; 198/579; 198/580

(58) Field of Classification Search ............... 198/442, 198/443, 445, 447, 450, 452, 453, 579, 347.4, 198/580, 605
See application file for complete search history.

(56) References Cited

U.S. PATENT DOCUMENTS 3,604,551 A * 9/1971 Fink .................... 198/448
4,401,207 A * 8/1983 Garvey .................... 198/580
5,551,551 A * 9/1996 Crawford ................. 198/453
6,168,005 B1 * 1/2001 Petrovic .................. 198/347.4
6,612,417 B2 * 9/2003 Garvey .................... 198/443
2005/0178640 A1 * 8/2005 Petrovic .................. 198/447

* cited by examiner

*Primary Examiner*—Gene O. Crawford
*Assistant Examiner*—Leslie A. Nicholson, III
(74) *Attorney, Agent, or Firm*—Rohm & Monsanto, PLC.

(57) ABSTRACT

A conveyor system transports a multiplicity of product items from an input portion to an output portion and is provided with a first conveyor that transports the product items from the input portion to a distal turnaround region. A second conveyor transports the product items from the distal turnaround region to a redistribution region. A first product transfer arrangement urges the product items from the first conveyor to the second conveyor. A plurality of exit conveyors are arranged to be parallel to each other for transporting the product items from the redistribution region to a product exit region located at the output portion, and are arranged to transport the product items at a respectively associated rates of transport. A product redistribution arrangement directs the product items to respective input ends of the plurality of exit conveyors. There is additionally provided a transverse element for directing the product items on the plurality of exit conveyors to a predetermined one of the plurality of exit conveyors.

24 Claims, 3 Drawing Sheets

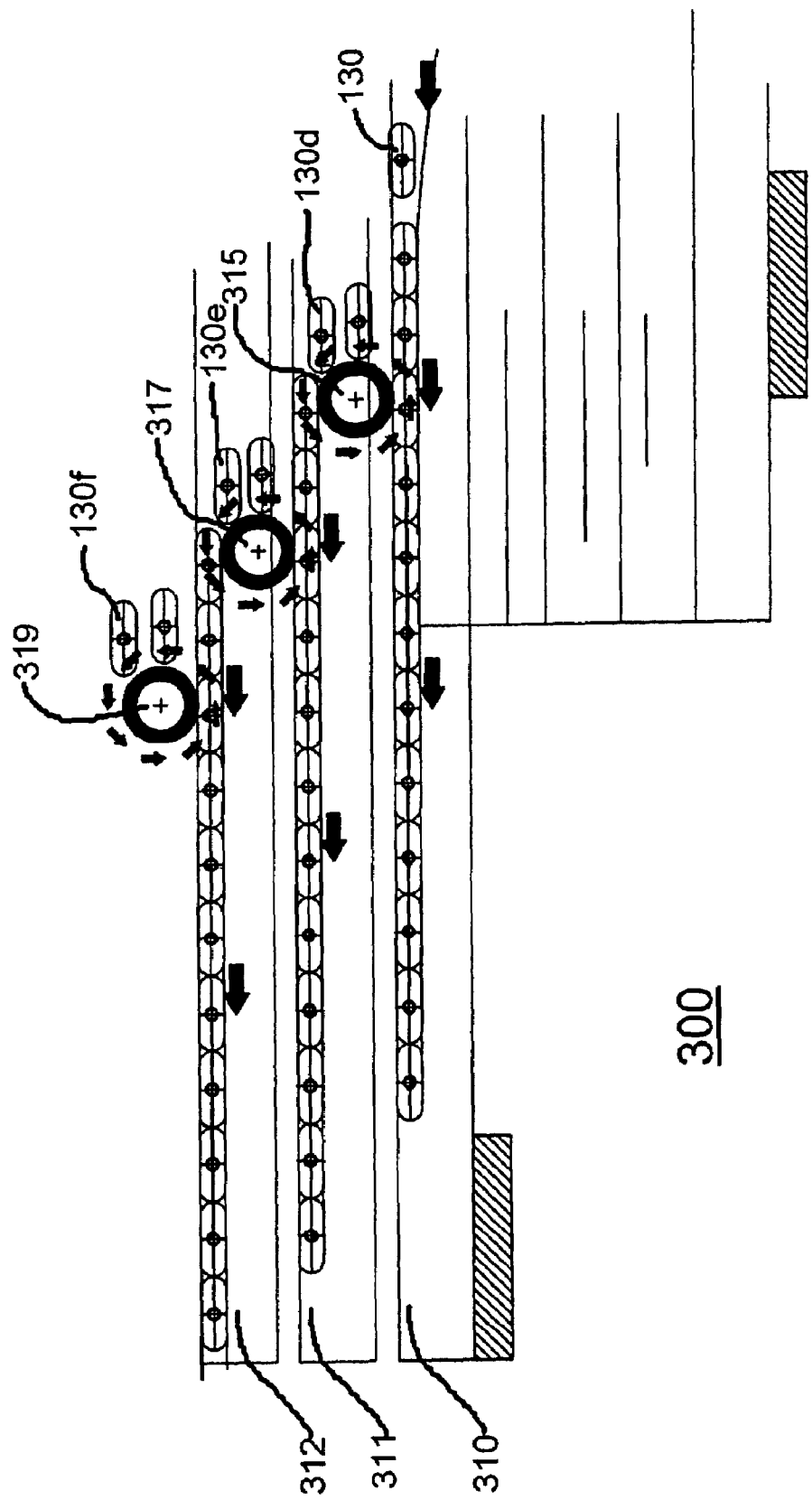

ACCUMULATING CONVEYOR SYSTEM

RELATIONSHIP TO OTHER APPLICATION

This application claims the benefit of Provisional Patent Application Ser. No. 60/541,300, filed on Feb. 2, 2004.

BACKGROUND OF THE INVENTION

1. Field of the Invention

This invention relates generally to conveyor systems, and more particularly, to an accumulating conveyor system that expels batch loaded product items in one or more single file outlet channels and accumulates the excess product items in response to the quantity of such product items being transported on plural exit conveyors.

2. Description of the Related Art

There are plural problems in the present state of the art in the field of conveyor systems that are used to deliver product items to downstream equipment, particularly in environments where the product items are delivered at varying rates, or in batches, to the conveyor system. It is, in those situations, not only desired that the conveyor system accumulate the excess product items pending their discharge, but also that the discharge of product items be in a continuous flow of back-to-back product items in single file. It is desired that accumulation of product items in the conveyor system be increased in the event of interruption in the downstream equipment or in the event that the inflow exceeds the desired discharge rate. All this, while maintaining proper orientation of non-round product items during discharge and without undue bumping between the product items, as they may be formed of glass or otherwise be fragile. In addition to minimizing product bumping, which is related to product back pressure, it is important that the product items not be subjected to undue rotation, as such may cause viscous liquid therein to be spun at a different rate that the container itself, resulting in a "gel wobble" instability and consequential toppling of the product items.

The various approaches to the noted problems in the prior art have proven unsatisfactory. Generally speaking, an effort to solve one problem exacerbates another, or creates a new problem. More specifically, in one known arrangement conveyor belts traveling at the same speed transport product items operate in conjunction with a guide that allows the product items to be moved from upstream to downstream locations during operation, and directs the product items to the accumulator section. In addition to requiring a large recirculating area by virtue of its continuous conveyor belt approach to achieving product item accumulation, the known arrangement does not redirect non-circular product items to a desired orientation in the exit port of the conveyor system. Thus, product items having elongated cross-section may temporarily block the exit port, resulting in a single file exit having gaps. In addition, the known arrangement is noisy in its operation as product items are directed to the accumulation area by bumping into product items that are to be discharged and thereby are deflected to the accumulation area. Accumulation capacity is almost exclusively a function of accumulation conveyor belt width in known systems. Thus, increases in accumulation capacity are effected by increasing conveyor belt width, which is achieved at the expense of mechanical complexity in causing belts of increasing width to be curved to form a substantially closed accumulation loop.

Some of these problems have been addressed by other known system. In one such system, a mass of product items is combined into a single file lane by using a moving guide belt disposed over a plurality of parallel conveying surfaces that travel at progressively increasing speeds. The object of the known arrangement, which requires multiple levels of conveyor belts, is to minimize rotation of the product items being conveyed. The product items, which traditionally are guided by stationary guide rails across belts having increasing relative speeds, are known to be rotatable at a speed of rotation that is a function of the rate of linear transport. Product rotation is reduced by forming a guide that is itself in the form of a guide belt, as a substitute for the stationary guide rails. The guide belt is caused to communicate with the product items at an angle and a speed with respect thereto that the rotation is minimized. Significant mechanical complexity and expense are associated with this known approach.

It is, therefore, an object of this invention to provide an accumulating conveyor arrangement that orients product items to conform to a desired exit orientation.

It is another object of this invention to provide an accumulating conveyor arrangement that reduces product bumping.

It is also an object of this invention to provide an accumulating conveyor arrangement that reduces product instability and toppling.

It is a further object of this invention to provide an accumulating conveyor arrangement that provides minimal product back pressure during either accumulation or straight-through discharge of the product items.

It is additionally an object of this invention to provide an accumulating conveyor arrangement that does not rely on curved closed loop conveyor belting to achieve product accumulation.

It is yet a further object of this invention to provide a conveyor system that does not rely on product back pressure to effect single file product discharge.

SUMMARY OF THE INVENTION

The foregoing and other objects are achieved by this invention which provides a product item conveyor system that accumulates the product items and selectively singulates them into one or more single file conveyor exit ports. The conveyor system of the present invention accommodates round, oval, rectangular, and square shaped product items in various sizes, and at various rates of product transport. In operation, the conveyor system of the present invention enables segregated low speed mass accumulation of product items while simultaneously affording automatic variable discharge high speed singulation of the product items at discharge. It is a significant advantage of the present conveyor system that the accumulator section can selectively be configured to accommodate any desired accumulation requirement without costly or complex controls. Bridging of product items, particularly as between discharge and accumulation portion of the conveyor system, is eliminated. This provides smooth production balance between up-stream and down-stream production machines with an increase in line efficiency.

It is a further advantage of the present invention that the product singulation achieved in the singulator area of the conveyor system provides virtually zero product back pressure during either accumulation or straight through discharge of the product items. Since singulation of product items is effected with very low speed requirements of this area, the present conveyor system will handle an array of different materials without the impact noise or impact damage generated by conventional accumulators. This also will eliminate the undesirable "gel wobble" effect that occurs when a viscous liquid inside a product item container has a different spin characteristic than the container itself, resulting in product toppling particularly at opposing conveyor chain direction transfers. The present invention, therefore, permits glass containers, for example, to be conveyed and processed with much less ringing noise during accumulation than in convention arrangements, and without consequential impact damage to the containers.

There is additionally provided in the conveyor system of the present invention a dynamic transfer section for accelerating product movement from the slow speed accumulator section to the high speed singulation area where discharge is effected. It is an advantage of the present invention that the dynamic transfer section will not require dead plates, and movement of product through this transition will be stepless and without product bumping as in conventional transfer arrangements. Thus, product items can be conveyed in mass, yet the product transfer is controlled.

As will be described in greater detail herein, the high speed singulation area is provided with multiple speed-up lanes that provide controlled single file and oriented product discharge. A variable speed control arm is provided to control production flow balance between low and high speed areas. More specifically, the product items are directed to the exit area by the variable speed control arm, but as the quantity of products is increased, the control arm allows the product items to be directed to the accumulation region. This ensures efficient slow speed recirculation of the product items being conveyed with a nominal flow of product in the singulating area without diminishing the discharge rates. In a specific illustrative embodiment of the invention, a curved discharge rail enhances the discharge rates by physically pre-orienting product prior to single file release at discharge via the one or more exit ports of the conveyor system.

There is additionally provided in some embodiments of the conveyor system of the present invention a variable speed controlled impetus apparatus, illustratively in the form of a rotating orienter wheel disposed at the discharge region of the conveyor system. One benefit of the inventive orienter wheel is that it addresses and overcomes the bridge problems that occur when the product items being conveyed are not round. In operation, the impetus apparatus will automatically urge each product item toward the slow speed accumulation area for circulation therein. In some embodiments, the impetus device serves the additional purpose of accelerating the product items into the discharge channel of the exit port to ensure a back-to-back properly oriented single file exit of the product items.

The foregoing notwithstanding, the primary function of this conveyor system is to achieve low speed accumulation for product in excess of discharge production requirements and provide only enough product into high speed singulation discharge area to meet those requirements. As will be described herein, the present invention facilitates multiple in-feed product item entry points and single or multiple discharge ports.

In accordance with a first system aspect of the invention, there is provided a conveyor system for transporting a multiplicity of product items from an input portion to an output portion. The conveyor system is provided with an input station located at the input portion for receiving the multiplicity of product items. A first conveyor transports the product items from the input portion to a distal turnaround region. A second conveyor transports the product items from the distal turnaround region to a redistribution region. There is additionally provided a first product transfer arrangement for urging the product items from the first conveyor to the second conveyor. A plurality of exit conveyors are arranged to be parallel to each other for transporting the product items from the redistribution region to a product exit region located at the output portion. The plurality of exit conveyors are arranged to transport the product items at a respectively associated rates of transport. A product redistribution arrangement directs the product items to respective input ends of the plurality of exit conveyors. There is additionally provided a transverse element for directing the product items on the plurality of exit conveyors to a predetermined one of the plurality of exit conveyors.

In one embodiment of the first system aspect of the invention, the first product transfer arrangement includes a first deflection rail disposes transverse to the first conveyor. The first and second conveyors are parallel to one another.

In a further embodiment, there is provided a third conveyor for transporting the product items from the redistribution region to the distal turnaround region. A second product transfer arrangement for urging the product items from the third conveyor to the second conveyor. The second product transfer arrangement includes a second deflection rail disposed transverse to the third conveyor.

A redistribution conveyor receives the product items from the second conveyor and distributes the product items to the plurality of exit conveyors, the redistribution conveyor being disposed in the redistribution region.

A control arrangement controls the distribution of the product items across the plurality of exit conveyors. In a specific illustrative embodiment of the invention, the control arrangement includes a control arm for communicating with the product items on the plurality of exit conveyors, the product items being directed toward ones of the plurality of exit conveyors having higher respectively associated velocities of transport in response to the numbers of the product items that communicate with the control arm. The control arm is arranged to pivot across the plurality of exit conveyors.

An impetus arrangement provides a transaxial impetus to each of the product items being transported on an associated one of the plurality of exit conveyors. The impetus arrangement includes a rotating wheel arranged to communicate at its circumference with each of the product items being transported on the associated one of the plurality of exit conveyors. In a further embodiment, the impetus arrangement includes a rotating wheel arranged to communicate at its circumference with each of the product items being transported on the associated one of the plurality of exit conveyors operating at the highest respectively associated rate of transport. The transaxial impetus provided by the impetus arrangement to each of the product items being transported on the associated one of the plurality of exit conveyors redirects each such product item to a conveyor exit port. Additionally, a further impetus arrangement provides a transaxial impetus to each of the product items being transported on a further associated one of the plurality of exit conveyors. The transaxial impetus provided by the further impetus arrangement to each of the product items being transported on the associated one of the plurality of exit conveyors redirects each such product item to a further conveyor exit port.

In one embodiment, the transverse element for directing the product items across the plurality of exit conveyors toward a predetermined one of the exit conveyors includes a third deflection rail arranged across selected ones of the plurality of exit conveyors. The predetermined one of the exit conveyors is the one of the plurality of exit conveyors operating at the highest respectively associated rate of transport.

In accordance with a further system aspect of the invention, there is provided a conveyor system for accumulating a predeterminable portion of a multiplicity of product items and transporting the product items from an input portion to an output portion. The conveyor system is provided with an input station for receiving the multiplicity of product items, and a first conveyor for transporting the product items from the input portion to a distal turnaround region at a first predetermined rate of transport. A second conveyor accumulates the product items and transports them from the distal turnaround region to a redistribution region at a second predetermined rate of transport. The predeterminable portion of the multiplicity if the product items to be accumulated is responsive to a relationship between the first and second predetermined rates of transport. There is additionally provided a first product transfer arrangement for urging the product items from the first conveyor to the second conveyor. A plurality of exit conveyors is arranged such that they are parallel to each other for transporting the product items from the redistribution region to a product exit region, the plurality of exit conveyors being arranged to transport the product items at a respectively associated rate of transport. At least one of the plurality of exit conveyors is arranged to direct the product items being transported thereon to a conveyor exit port. A product item redistribution arrangement is located in the redistribution region for transporting the product items to respective input ends of the plurality of exit conveyors.

In one embodiment, the at least one of the plurality of exit conveyors is arranged to direct the product items being transported thereon to a conveyor exit port having the highest respectively associated rate of transport. An impetus arrangement provides a transaxial impetus to each of the product items being transported on an associated one of the plurality of exit conveyors, whereby each of the product items being transported on an associated one of the plurality of exit conveyors is redirected to the at least one of the plurality of exit conveyors arranged to direct the product items being transported thereon to the conveyor exit port. The impetus arrangement is arranged to provide axial impetus to each of the product items being transported on the at least one of the plurality of exit conveyors arranged to direct the product items being transported thereon to the conveyor exit port, whereby the product items being transported thereon are accelerated toward the conveyor exit port.

In a highly advantageous embodiment there is further provided an accumulation control arrangement for varying the proportion of product items being directed to the second conveyor relative to the product items being directed to the to conveyor exit port. The accumulation control arrangement includes a displaceable control arm that is displaced in response to communication with product items being transported on at least some of the plurality of exit conveyors. In one embodiment, the displaceable control arm is displaced angularly in response to communication with product items being transported on at least some of the plurality of exit conveyors, whereby increasing numbers of the product items communicating with the displaceable control arm result in an increase in the angular displacement of the control arm and a corresponding increase in the numbers of product items accumulated on the second conveyor. In one embodiment, a third conveyor is interposed between the second conveyor and the plurality of exit conveyors, for accumulating the product items and transporting the product items to the distal turnaround region. Thus, increasing numbers of the product items communicating with the displaceable control arm result in a corresponding increase in the numbers of product items accumulated on the third conveyor.

BRIEF DESCRIPTION OF THE DRAWING

Comprehension of the invention is facilitated by reading the following detailed description, in conjunction with the annexed drawing, in which:

FIG. 3 is a simplified schematic representation of a specific illustrative embodiment of the invention having multiple outlet ports.

DETAILED DESCRIPTION

Figure 1:
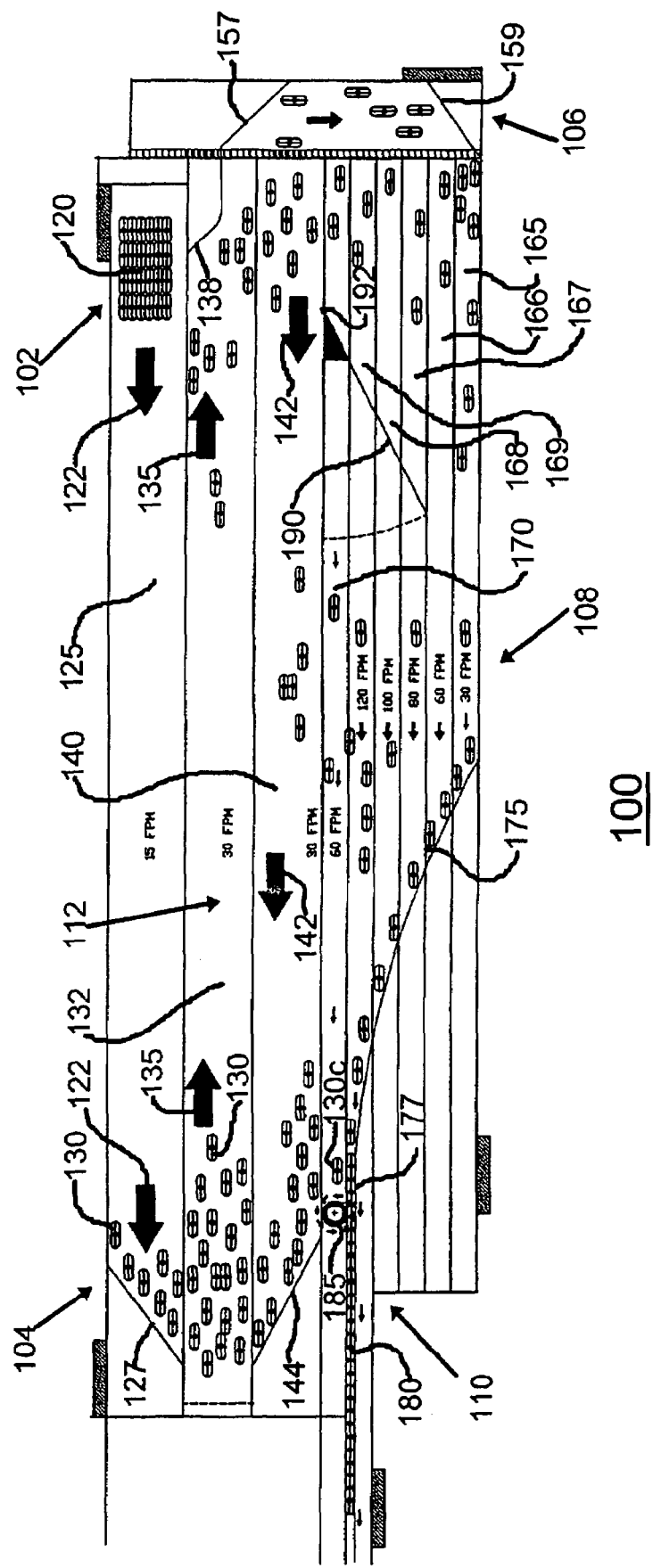
FIG. 1 is a simplified schematic representation of a specific illustrative embodiment of the invention.

FIG. 1 is a simplified schematic representation of a specific illustrative embodiment of the invention. As shown in this figure, an accumulating conveyor system 100 is generally configured to have a product receiving section 102, a product turnaround section 104, a product redistribution section 106, a product singularization section 108, a discharge section 110, and an accumulation section 112. In the operation of the specific illustrative embodiment of the invention, a plurality of product items in a batch 120 are deposited at product receiving section 102. Batch 120 of product items is transported in the direction of arrows 122 on conveyor surface 125 until it reaches product turnaround section 104.

At product turnaround section 104, batch 120 encounters a guide rail 127 whereupon the batch is disbanded into separated individual ones of product items 130. By operation of guide rail 127, product items 130 are diverted onto conveyor surface 132, where the direction of transport is reversed, as illustrated by arrows 135. It is to be noted that the product items are separated from one another, rather than retaining the batch relationship, at least partially as a result of a change in the rate of linear transport. In this specific illustrative embodiment of the invention, conveyor surface 125 operates at a first rate of travel, illustratively 15 fps, whereas conveyor surface 132 operates at a higher rate, illustratively 30 fps. Persons of skill in the art would recognize that the capacity of accumulation and the spacing between individual ones of the product items can be governed by controlling the respective rates of transport of the conveyor surfaces.

Conveyor surface 132 transports product items 130 toward product redistribution section 106. Some of the product items are deflected by deflector 138 onto a further conveyor surface 140 that operates to transport product items 130 in the direction of arrows 142. Conveyor surface 140 operates in a manner similar to conveyor surface 125, in that product items 130 are conveyed toward product turnaround section 104 until they encounter a deflection rail 144, whereupon the product items are deflected onto conveyor surface 132. As such therefore, those ones of product items that have been deflected onto a further conveyor surface 140 are essentially in the condition of recirculation accumulation. However, some of the product items will pass through to product redistribution section 106, which is described in greater detail in connection with FIG. 2.

Figure 2:
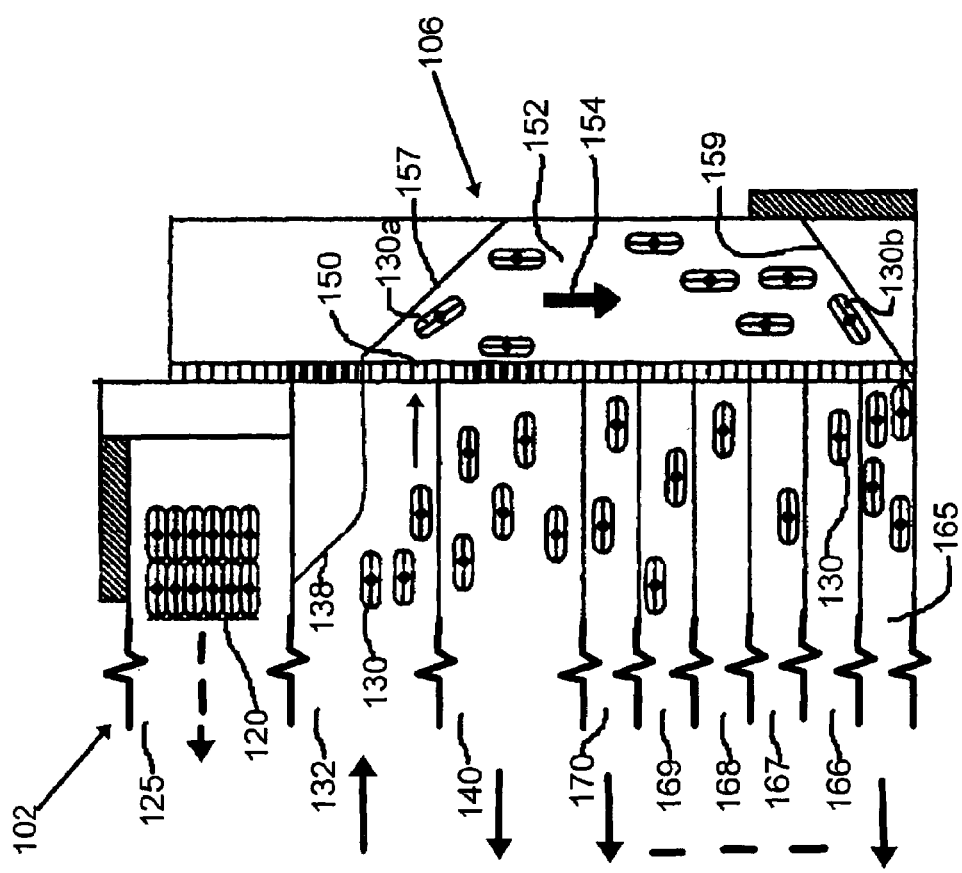
FIG. 2 is a simplified schematic representation of the redistribution region of the specific illustrative embodiment of the invention of FIG. 1.

FIG. 2 is a simplified schematic representation of redistribution region 106 of the specific illustrative embodiment of the invention of FIG. 1. As shown in this figure, ones of product items 130 that pass through portal 150 are deposited onto conveyor surface 152 that operates axially transverse to the conveyor surfaces previously described, in the direction of arrow 154. Some of the product items on conveyor surface 152 will be reoriented by communication with guide rail 157, as is the case with product item 130a, which is shown to be reoriented. The product items are transported toward a further guide rail 159 where they are deflected toward conveyor surface 165, and may be reoriented, as is the case with conveyor surface 130b. In situations where a significant number of product items are being transported by conveyor surface 152, the product items are additionally distributed to others of the conveyor surfaces, which include conveyor surfaces 165 to 170, as well as conveyor surface 140.

Referring once again to FIG. 1, it is seen that product items 130 are deposited onto conveyor surfaces 165 to 170, and onto conveyor surface 170. Conveyor surfaces 165 to 170 are operated at incrementally increasing rates of transport. In this specific illustrative embodiment of the invention, conveyor surface 165 operates at 30 fpm; conveyor surface 166 operates at 60 fpm, conveyor surface 167 operates at 80 fpm, conveyor surface 168 operates at 100 fpm, conveyor surface 169 operates at 120 fpm, and conveyor surface 170 operates more slowly at 60 fpm. In this embodiment, conveyor surfaces 165 to 170, as well as conveyor surface 140, are operated in the same direction of travel.

The product items transported at different rates on conveyor surfaces 165 to 169 ultimately communicate with a guide rail 175, which in this specific illustrative embodiment of the invention is shown to be convexly curved. Other curvatures may be used in the practice of the invention, as well as a straight configuration, the specific curvature being responsive to the rate of discharge of the product items. The product items 130 are directed by guide rail 175 to a discharge port 177. An outlet channel 180 is coupled to discharge port 177 and shows the discharged product items to be issued from the conveyor system in oriented single file arrangement.

Product items that are transported on conveyor surface 170, such as product item 130c, communicate with rotating wheel 185, which is rotated counter-clockwise by a rotatory device, such as a motor (not shown). The rotating wheel provides a transaxial impetus to product item 130c, whereby it is directed onto conveyor surface 140. Product item 130c is subsequently directed onto conveyor surface 132 by operation of guide rail 144, as previously described.

A significant aspect of the present invention relates to the manner in which product items are controlled to achieve a desired balance between those that will be discharged via the high speed conveyor surfaces and those that will be accumulated via the slower conveyor surfaces. Such control is achieved in response to the volume of product items that is being conveyed along conveyor surfaces 167 to 170. The product items on these conveyor surfaces communicates with a control arm 190 that, in this specific illustrative embodiment of the invention, is shown to pivot about a pivot point 192. As a large volume of product items (not specifically designated) is transported along conveyor surfaces 167 to 170, it contacts control arm 190. The larger the volume of product items, the further it is that the control arm is pivotally upwardly displace (as seen in the figure), thereby permitting a larger number of product items to be directed to accumulation. If only a few product items impact the control arm, the control arm will not be significantly pivotally displaced, causing the relatively few product items to be directed toward discharge. Preferably, the response of the control arm to the force applied by the product items being conveyed is controllable, whereby the balance between discharge and accumulation can be determined by the operator (not shown) of the conveyor system.

FIG. 3 is a simplified schematic representation of a specific illustrative embodiment of the invention having multiple outlet ports. As shown in this figure, a multiple discharge arrangement 300 for a conveyor system is provided with three discharge outlets 310, 311, and 312. There are additionally provided in this specific illustrative embodiment of the invention three rotating wheels 315, 317, and 319. Each of the rotating wheels is shown in the figure to be rotating in a counter-clockwise direction. Thus, in a manner similar to that described in connection with FIG. 1, rotating wheel 315 provides a transaxial impetus, or kick, to product item 130d, whereby product item 130d is urged toward discharge outlet 311. Similarly, rotating wheel 317 provides a transaxial impetus to product item 130e. In a further embodiment, rotating wheel 315, for example, communicates with the product items that enter into discharge outlet 311, thereby ensuring that each product item is accelerated briefly toward the immediately prior product item to prevent the formation of gaps in the flow of discharged product items.

Although the invention has been described in terms of specific embodiments and applications, persons skilled in the art may, in light of this teaching, generate additional embodiments without exceeding the scope or departing from the spirit of the invention described herein. Accordingly, it is to be understood that the drawing and description in this disclosure are proffered to facilitate comprehension of the invention, and should not be construed to limit the scope thereof.

What is claimed is:

1. A conveyor system for transporting a multiplicity of product items from an input portion to an output portion, the conveyor system comprising:

an input station located at the input portion for receiving the multiplicity of product items;

a turnaround region disposed in distal relation to said input station;

a first conveyor for transporting the product items from said input portion to a distal said turnaround region;

a redistribution region disposed in distal relation to said turnaround region;

a second conveyor for transporting the product items from the distal said turnaround region to said redistribution region;

a first product transfer arrangement for urging the product items from said first conveyor to said second conveyor;

a plurality of exit conveyors arranged parallel to each other for transporting the product items from said redistribution region to a product exit region located at the output portion, said plurality of exit conveyors being arranged to transport the product items at respectively associated rates of transport;

a product redistribution arrangement for directing the product items to respective input ends of said plurality of exit conveyors;

a transverse element for directing the product items on said plurality of exit conveyors to a predetermined one of said plurality of exit conveyors; and an impetus arrangement for providing a transaxial impetus to the product items being transported on an associated one of said plurality of exit conveyors.

2. The conveyor system of claim 1, wherein said first product transfer arrangement comprises a first deflection rail disposed transverse to said first conveyor.

3. The conveyor system of claim 2, further comprising:
a third conveyor for transporting the product items from said redistribution region to said turnaround region; and
a second product transfer arrangement for urging the product items from said third conveyor to said second conveyor.

4. The conveyor system of claim 3, wherein said second product transfer arrangement comprises a second deflection rail disposed transverse to said third conveyor.

5. The conveyor system of claim 2, wherein said transverse element for directing the product items across said plurality of exit conveyors toward a predetermined one of said exit conveyors comprises a third deflection rail arranged across selected ones of said plurality of exit conveyors.

6. The conveyor system of claim 5, wherein the predetermined one of said exit conveyors is the one of said plurality of exit conveyors operating at the highest respectively associated rate of transport.

7. The conveyor system of claim 1, wherein said first and second conveyors are parallel to one another.

8. The conveyor system of claim 1, wherein there is further provided a redistribution conveyor for receiving the product items from said second conveyor and distributing the product items to said plurality of exit conveyors, said redistribution conveyor being disposed in said redistribution region.

9. The conveyor system of claim 1, wherein there is further provided a control arrangement for controlling the distribution of the product items across said plurality of exit conveyors.

10. The conveyor system of claim 9, wherein said control arrangement comprises a control arm for communicating with the product items on said plurality of exit conveyors, the product items being directed toward ones of said plurality of exit conveyors having higher respectively associated velocities of transport in response to the numbers of the product items that communicate with said control arm.

11. The conveyor system of claim 10, wherein said control arm is arranged to pivot across said plurality of exit conveyors.

12. The conveyor system of claim 1, wherein said impetus arrangement comprises a rotating wheel arranged to communicate at its circumference with each of the product items being transported on the associated one of said plurality of exit conveyors.

13. The conveyor system of claim 1, wherein said impetus arrangement comprises a rotating wheel arranged to communicate at its circumference with each of the product items being transported on the associated one of said plurality of exit conveyors operating at the highest respectively associated rate of transport.

14. The conveyor system of claim 1, wherein the transaxial impetus provided by said impetus arrangement to each of the product items being transported on the associated one of said plurality of exit conveyors redirects each such product item to a conveyor exit port.

15. The conveyor system of claim 1, wherein there is further provided a further impetus arrangement for providing a transaxial impetus to each of the product items being transported on a further associated one of said plurality of exit conveyors.

16. The conveyor system of claim 15, wherein the transaxial impetus provided by said further impetus arrangement to each of the product items being transported on the associated one of said plurality of exit conveyors redirects each such product item to a further conveyor exit port.

17. A conveyor system for accumulating a predeterminable portion of a multiplicity of product items and transporting the product items from an input portion to an output portion, the conveyor system comprising:

an input station for receiving the multiplicity of product items;

a turnaround region disposed in distal relation to said input station;

a first conveyor for transporting the product items from said input portion to said turnaround region at a first predetermined rate of transport;

a redistribution region disposed in distal relation to said turnaround region;

a second conveyor for accumulating the product items and transporting the product items from the distal said turnaround region to said redistribution region at a second predetermined rate of transport, the predeterminable portion of the multiplicity if the product items to be accumulated being responsive to a relationship between the first and second predetermined rates of transport;

a first product transfer arrangement for urging the product items from said first conveyor to said second conveyor;

a plurality of exit conveyors arranged parallel to each other for transporting the product items from said redistribution region to a product exit region, said plurality of exit conveyors being arranged to transport the product items at a respectively associated rate of transport, at least one of said plurality of exit conveyors being arranged to direct the product items being transported thereon to a conveyor exit port;

a product item redistribution arrangement located in said redistribution region for transporting the product items to respective input ends of said plurality of exit conveyors; and an impetus arrangement for providing a transaxial impetus to each of the product items being transported on an associated one of said plurality of exit conveyors, whereby the product items being transported on an associated one of said plurality of exit conveyors are redirected to the at least one of said plurality of exit conveyors arranged to direct the product items being transported thereon to the conveyor exit port.

18. The conveyor system of claim 17, wherein the at least one of said plurality of exit conveyors being arranged to direct the product items being transported thereon to a conveyor exit port having the highest respectively associated rate of transport.

19. The conveyor system of claim 17, wherein said impetus arrangement is arranged to provide axial impetus to each of the product items being transported on the at least one of said plurality of exit conveyors arranged to direct the product items being transported thereon to the conveyor exit port, whereby the product items being transported thereon are accelerated toward the conveyor exit port.

20. The conveyor system of claim 17, wherein there is further provided an accumulation control arrangement for varying the proportion of product items being directed to said second conveyor relative to the product items being directed to the to conveyor exit port.

21. The conveyor system of claim 20, wherein said accumulation control arrangement comprises a displaceable control arm.

22. The conveyor system of claim 21, wherein said displaceable control arm is displaced in response to communication with product items being transported on at least some of said plurality of exit conveyors.

23. The conveyor system of claim 22, wherein said displaceable control arm is displaced angularly in response to communication with product items being transported on at least some of said plurality of exit conveyors, whereby increasing numbers of the product items communicating with said displaceable control arm result in a corresponding increase in the numbers of product items accumulated on said second conveyor.

24. The conveyor system of claim 22, wherein there is further provided a third conveyor interposed between said second conveyor and said plurality of exit conveyors, for accumulating the product items and transporting the product items to the distal turnaround region, whereby increasing numbers of the product items communicating with said displaceable control arm result in a corresponding increase in the numbers of product items accumulated on said third conveyor.

* * * * *